United States Patent
Pozzi et al.

(10) Patent No.: US 10,189,406 B1
(45) Date of Patent: Jan. 29, 2019

(54) OVERHEAD STORAGE BIN UTILIZATION DETECTION AND DISPLAY SYSTEM

(71) Applicant: B/E Aerospace, Inc., Winston-Salem, NC (US)

(72) Inventors: Alexander N. Pozzi, Winston-Salem, NC (US); Robert D. Wilkey, Atlanta, GA (US); Francis Xavier L. Garing, Atlanta, GA (US); Alyssa G. Mellett, Kennesaw, GA (US); Julia M. Brooks, Atlanta, GA (US); Jae Hun Gu, Doraville, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/944,064

(22) Filed: Apr. 3, 2018

(51) Int. Cl.
*B60Q 9/00* (2006.01)
*B60R 5/00* (2006.01)

(52) U.S. Cl.
CPC . *B60Q 9/00* (2013.01); *B60R 5/00* (2013.01)

(58) Field of Classification Search
CPC .................................. B60Q 9/00; B60R 5/00
See application file for complete search history.

(56) References Cited

U.S. PATENT DOCUMENTS

2017/0283086 A1* 10/2017 Garing ............ B64D 11/00155

\* cited by examiner

*Primary Examiner* — Leon Flores
(74) *Attorney, Agent, or Firm* — Clements Bernard Walker PLLC

(57) ABSTRACT

A storage bin space utilization detection and display system for use with a storage bin for storing one or more objects, including: a plurality of sensors disposed within an interior portion of the storage bin, wherein each of the plurality of sensors is associated with one of a plurality of regions defined within the interior portion of the storage bin, wherein each of the plurality of sensors is operable for detecting a presence/absence of the one or more objects within the associated region defined within the interior portion of the storage bin; and a visual indicator device operable for indicating the detected presence/absence of the one or more objects within the associated region defined within the interior portion of the storage bin to an individual outside of the storage bin.

18 Claims, 4 Drawing Sheets

OVERHEAD STORAGE BIN UTILIZATION DETECTION AND DISPLAY SYSTEM

BACKGROUND

In air travel, water travel, rail travel, bus travel, and the like it is common for passengers to store their carry-on luggage and bags in overhead storage bins located in the passenger compartment, typically over the passenger seats. Typically, each overhead storage bin is loosely associated with a block of passenger seats by proximity, can hold a number of bags, and utilizes a relatively large door. When passengers board an airplane, boat, train, bus, or the like, it is common for them to open several overhead storage bin doors as they walk down the aisle in the passenger compartment, checking for empty overhead storage bin space for their bags. This is a time-consuming process that slows down the passenger boarding process. It also presents a potential safety issue. The fewer overhead storage bin doors each passenger has to open and the more quickly each passenger finds empty overhead storage bin space for their bags the better in terms of efficiency and safety.

In order to address this problem, several overhead storage bin space detection and display systems have been developed. These typically consist of an electromagnetic beam sensor or the like disposed in the interior of an overhead storage bin configured to detect the present of a bag or other object in the overhead storage bin. Such presence/absence is then signaled to passengers and flight crew using a full/empty light disposed adjacent to the overhead storage bin. In one refinement, the electromagnetic beam sensor is replaced with a load sensor operable for determining bag or other object weight in the overhead storage bin and coordinating this with an overall utilization percentage. This information is then communicated via a display. Disadvantageously, these overhead storage bin space detection and display systems provide simple binary full/empty information and/or provide only an overall utilization percentage. They do nothing to provide horizontal or vertical space utilization information within the overhead storage bin.

What is still needed in the art is an overhead storage bin space utilization detection and display system that detects bags or other objects within an overhead storage bin, assesses both horizontal and vertical space utilization within the overhead storage bin, and communicates this information to passengers and/or crew members such that empty overhead storage bin space can be readily identified and utilized.

SUMMARY

In various aspects, embodiments of the inventive concepts disclosed herein are directed to an overhead storage bin utilization detection and display system that detects bags or other objects within an overhead storage bin, assesses both horizontal and vertical space utilization within the overhead storage bin, and communicates this information to passengers and/or crew members such that empty overhead storage bin space can be readily identified and utilized. The information is communicated to passengers and/or crew members via indicator lights, a display, and/or a mobile device coupled to the system via a controller/processor and a wired or wireless link. Although an overhead storage bin is specifically referred to herein, it will be readily apparent to those of ordinary skill in the art that the system may be used equally in conjunction with any other type of storage bin utilized in an airplane, boat, train, bus, or the like.

In one aspect, embodiments of the inventive concepts disclosed herein are directed to a storage bin space utilization detection and display system for use with a storage bin for storing one or more objects, including: a plurality of sensors disposed within an interior portion of the storage bin, wherein each of the plurality of sensors is associated with one of a plurality of regions defined within the interior portion of the storage bin, wherein each of the plurality of sensors is operable for detecting a presence/absence of the one or more objects within the associated region defined within the interior portion of the storage bin; and a visual indicator device operable for indicating the detected presence/absence of the one or more objects within the associated region defined within the interior portion of the storage bin to an individual outside of the storage bin. The plurality of sensors are mounted to a fixed surface disposed within the interior portion of the storage bin. Optionally, the plurality of sensors include a plurality of electromagnetic beam sensors. Each of the plurality of sensors is further operable for determining one or more of a relative size of the one or more objects within the associated region defined within the interior portion of the storage bin and an amount of space remaining within the associated region defined within the interior portion of the storage bin. The visual indicator device is further operable for indicating the determined one or more of the relative size of the one or more objects within the associated region defined within the interior portion of the storage bin and the amount of space remaining within the associated region defined within the interior portion of the storage bin to the individual outside of the storage bin. The plurality of sensors and the visual indicator device are coupled to one or more of a processor and a controller. Optionally, the visual indicator device includes one or more lights disposed outside of the storage bin. Optionally, the visual indicator device includes a graphical display. Optionally, the system also includes a wireless router coupled to the plurality of sensors and the visual indicator device includes a mobile device executing an application. Optionally, the visual indicator device is associated with a cabin management system.

In another aspect, embodiments of the inventive concepts disclosed herein are directed to a storage bin for storing one or more objects, including: a storage bin housing; a door coupled to the storage bin housing; and a storage bin space utilization detection and display system, including: a plurality of sensors disposed within an interior portion of the storage bin housing, wherein each of the plurality of sensors is associated with one of a plurality of regions defined within the interior portion of the storage bin housing, wherein each of the plurality of sensors is operable for detecting a presence/absence of the one or more objects within the associated region defined within the interior portion of the storage bin housing; and a visual indicator device operable for indicating the detected presence/absence of the one or more objects within the associated region defined within the interior portion of the storage bin housing to an individual outside of the storage bin housing. The plurality of sensors are mounted to a fixed surface disposed within the interior portion of the storage bin housing. Optionally, the plurality of sensors include a plurality of electromagnetic beam sensors. Each of the plurality of sensors is further operable for determining one or more of a relative size of the one or more objects within the associated region defined within the interior portion of the storage bin housing and an amount of space remaining within the associated region defined within the interior portion of the storage bin housing. The visual indicator device is further operable for indicating the determined one or more of the relative size of the one or more objects within the associated region defined within the interior portion of the storage bin housing and the amount of space remaining within the associated region defined within the interior portion of the storage bin housing to the individual outside of the storage bin housing. The plurality of sensors and the visual indicator device are coupled to one or more of a processor and a controller. Optionally, the visual indicator device includes one or more lights disposed outside of the storage bin housing. Optionally, the visual indicator device includes a graphical display. Optionally, the system further includes a wireless router coupled to the plurality of sensors and the visual indicator device comprises a mobile device executing an application. Optionally, the visual indicator device is associated with a cabin management system.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Figure 1:
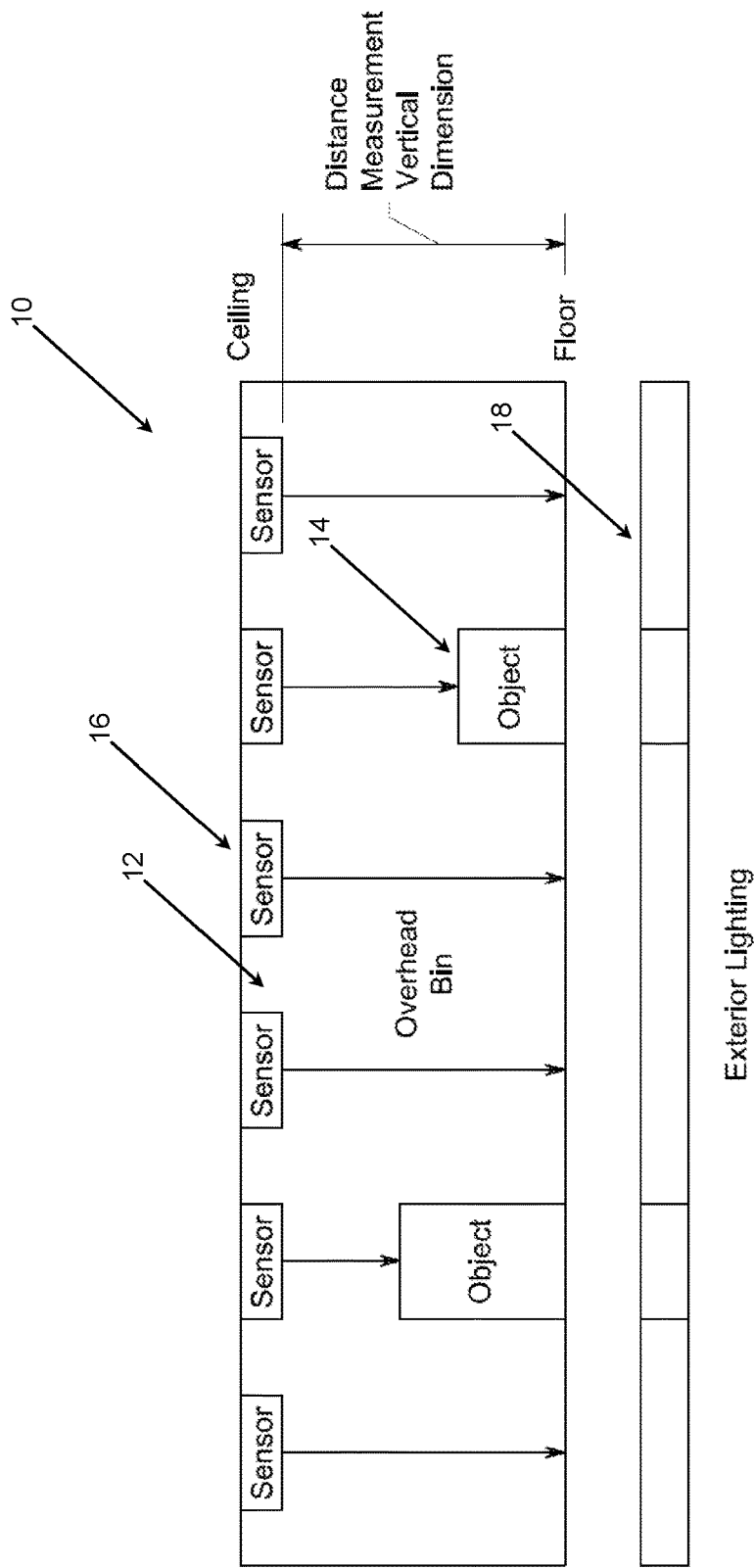
FIG. 1 is a schematic view of one exemplary embodiment of the overhead storage bin utilization detection and display system of the present disclosure.

Referring specifically to FIG. 1, the inventive concepts disclosed herein are generally directed to a storage bin space utilization detection and display system 10 for use with a storage bin 12 for storing one or more objects 14. The sensor system 10 includes a plurality of sensors 16 disposed within an interior portion of the storage bin 12. Each of the plurality of sensors 16 is associated with one of a plurality of regions defined within the interior portion of the storage bin 12. Each of the plurality of sensors 16 is operable for detecting, at a minimum, the presence/absence of the one or more objects 14 within the associated region defined within the interior portion of the storage bin 12. In one exemplary embodiment, the plurality of sensors 16 are mounted linearly along a fixed structure at the top or back of the storage bin 12, although other suitable configurations can be used equally. Optionally, the plurality of sensors 16 include a plurality of electromagnetic beam sensors, each of which directs a beam of visible light, infrared (IR) radiation, laser light, or the like into the interior portion of the storage bin 12 and towards the one or more objects in the associated region. Each of these electromagnetic beam sensors may be a through ranging sensor, a reflective ranging sensor, or a diffusion ranging sensor, well known to those of ordinary skill in the art. Other types of sensors may be used equally. The number and spacing of sensors 16 used will determine the overall sensing resolution.

In a preferred embodiment, each of the plurality of sensors 16 is further operable for determining one or more of the relative size of the one or more objects 14 within the associated region defined within the interior portion of the storage bin 12 and an amount of space remaining within the associated region defined within the interior portion of the storage bin 12. In this preferred embodiment, each of the sensors 16 measures the distance to the bottom or front of the storage bin 12, depending on the placement of the sensor 16, and the distance to the top or back of an intervening object 14, again depending on the placement of the sensor 16. Processing logic either communicates this information or converts it to an associated measurement or figure for remaining available space in that region of the storage bin 12. In this manner, information may be provided regarding available space in each defined region of the storage bin 12. One or more weight sensors may also be used to supplement this information.

A visual indicator device 18 operable for indicating the detected presence/absence of the one or more objects 14 within the associated region defined within the interior portion of the storage bin 12 to an individual outside of the storage bin 12 is also provided and coupled to the array of sensors 16. Preferably, the visual indicator device 18 is further operable for indicating the determined relative size of the one or more objects 14 within the associated region defined within the interior portion of the storage bin 12 or the amount of space remaining within the associated region defined within the interior portion of the storage bin 12 to the individual outside of the storage bin 12. The plurality of sensors 16 and the visual indicator device 18 may be coupled to a processor/controller accordingly. Optionally, the visual indicator device 18 includes one or more dedicated lights, such as light-emitting diodes (LEDs), or cabin lights disposed outside of the storage bin 12. In either of these cases, the lights may be visually associated with each region of a particular storage bin 12 and/or sensor 16 and indicate the amount of space left in that region of the storage bin 12 using a red/yellow/green methodology, a gradient light array, a gradient light bar, etc.—i.e. any methodology that indicates to the passenger or crew member how much space is still available in that storage bin 12 even when the door is closed. This facilitates rapid filling of all available storage bin space.

Alternatively, or in addition, the visual indicator device 18 includes a graphical display, such as a computer screen or the like. Again, portions of the graphical display are associated with each region of a particular storage bin 12 and/or sensor 16 and indicate the amount of space left in that region of the storage bin 12 using a red/yellow/green methodology, a gradient array, a gradient bar, etc.—i.e. any methodology that indicates to the passenger or crew member how much space is still available in that storage bin 12 even when the door is closed. This facilitates rapid filling of all available storage bin space. This graphical display may be located in a physical location adjacent to the storage bins 12 at issue and/or may be made available via a mobile device application or the like, as is described in greater detail herein below. In a practical embodiment, the graphical display depicts a map of the various storage bins 12 and provides a numerical or graphical indicator of the space remaining in each.

In accordance with this last aspect, the system 10 also includes a wireless router or link 20 (FIG. 4) coupled to the plurality of sensors 16 and the visual indicator device 18 includes a mobile device 22 (FIG. 4) executing the application. Optionally, the visual indicator device 18 is associated with a cabin management system (CMS), well known to those of ordinary skill in the art.

Figure 2:
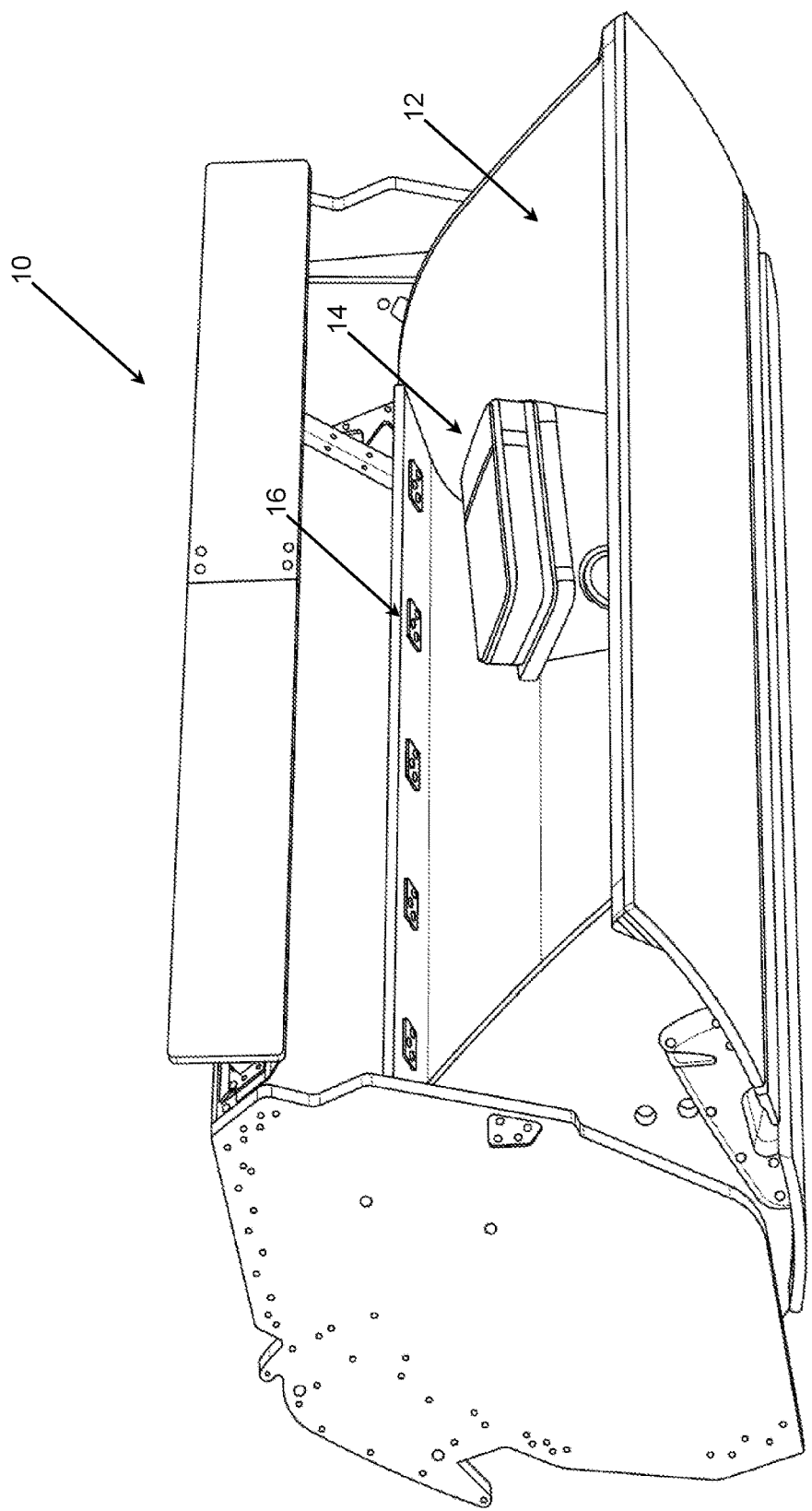
FIG. 2 is a perspective view of one exemplary embodiment of the overhead storage bin utilization detection and display system of the present disclosure, illustrating an open overhead storage bin door.
Figure 3:
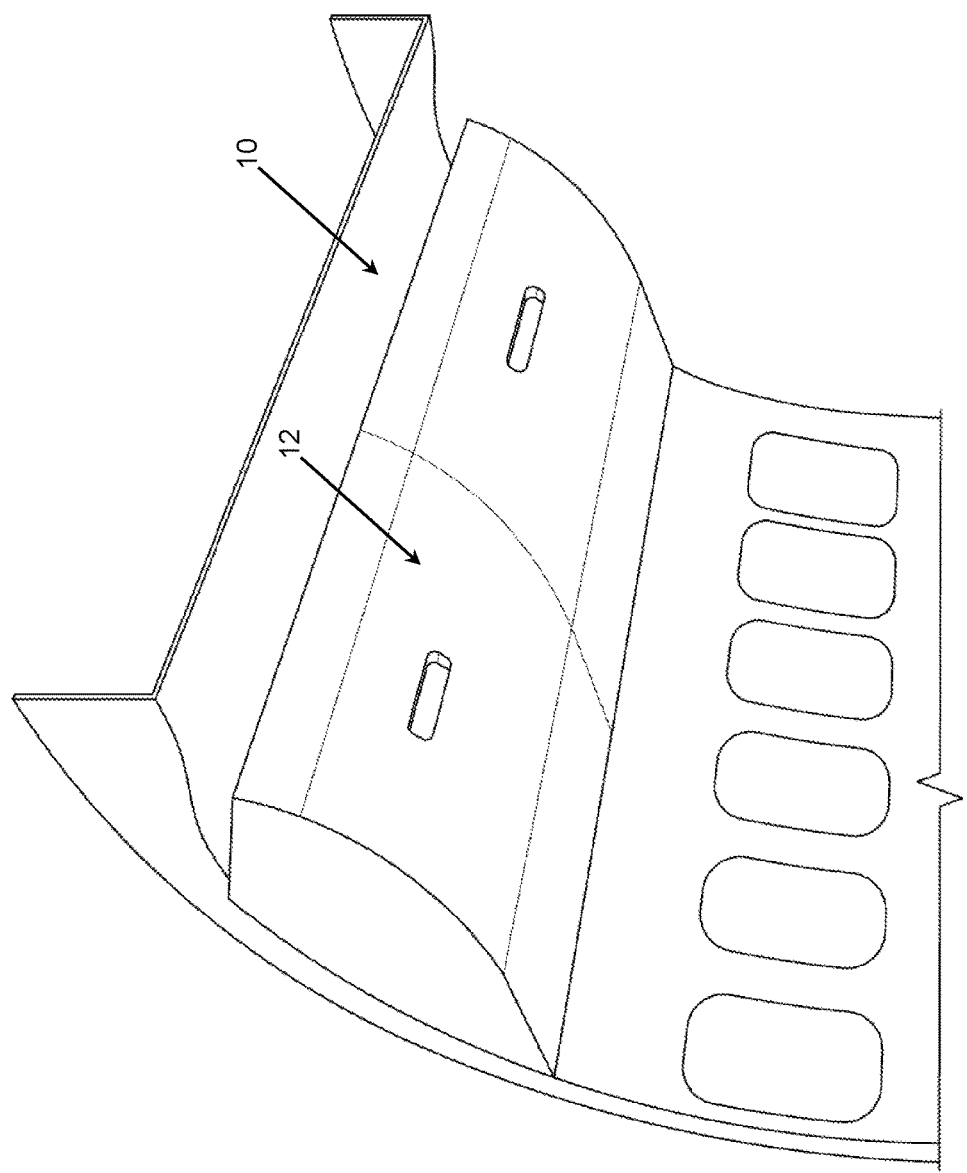
FIG. 3 is another perspective view of one exemplary embodiment of the overhead storage bin utilization detection and display system of the present disclosure, illustrating a closed overhead storage bin door.

Referring specifically to FIGS. 2 and 3, the inventive concepts disclosed herein are again generally directed to a storage bin space utilization detection and display system 10 for use with a storage bin 12 for storing one or more objects 14. The sensor system 10 includes a plurality of sensors 16 disposed within an interior portion of the storage bin 12. Each of the plurality of sensors 16 is associated with one of a plurality of regions defined within the interior portion of the storage bin 12. Each of the plurality of sensors 16 is operable for detecting, at a minimum, the presence/absence of the one or more objects 14 within the associated region defined within the interior portion of the storage bin 12. In one exemplary embodiment, the plurality of sensors 16 are mounted linearly along a fixed structure at the top or back of the storage bin 12, although other suitable configurations can be used equally. Optionally, the plurality of sensors 16 include a plurality of electromagnetic beam sensors, each of which directs a beam of visible light, infrared (IR) radiation, laser light, or the like into the interior portion of the storage bin 12 and towards the one or more objects in the associated region. Each of these electromagnetic beam sensors may be a through ranging sensor, a reflective ranging sensor, or a diffusion ranging sensor, well known to those of ordinary skill in the art. Other types of sensors may be used equally. The number and spacing of sensors 16 used will determine the overall sensing resolution. In a preferred embodiment, each of the plurality of sensors 16 is further operable for determining one or more of the relative size of the one or more objects 14 within the associated region defined within the interior portion of the storage bin 12 and an amount of space remaining within the associated region defined within the interior portion of the storage bin 12. In this preferred embodiment, each of the sensors 16 measures the distance to the bottom or front of the storage bin 12, depending on the placement of the sensor 16, and the distance to the top or back of an intervening object 14, again depending on the placement of the sensor 16. Processing logic either communicates this information or converts it to an associated measurement or figure for remaining available space in that region of the storage bin 12. In this manner, information may be provided regarding available space in each defined region of the storage bin 12. One or more weight sensors may also be used to supplement this information.

Figure 4:
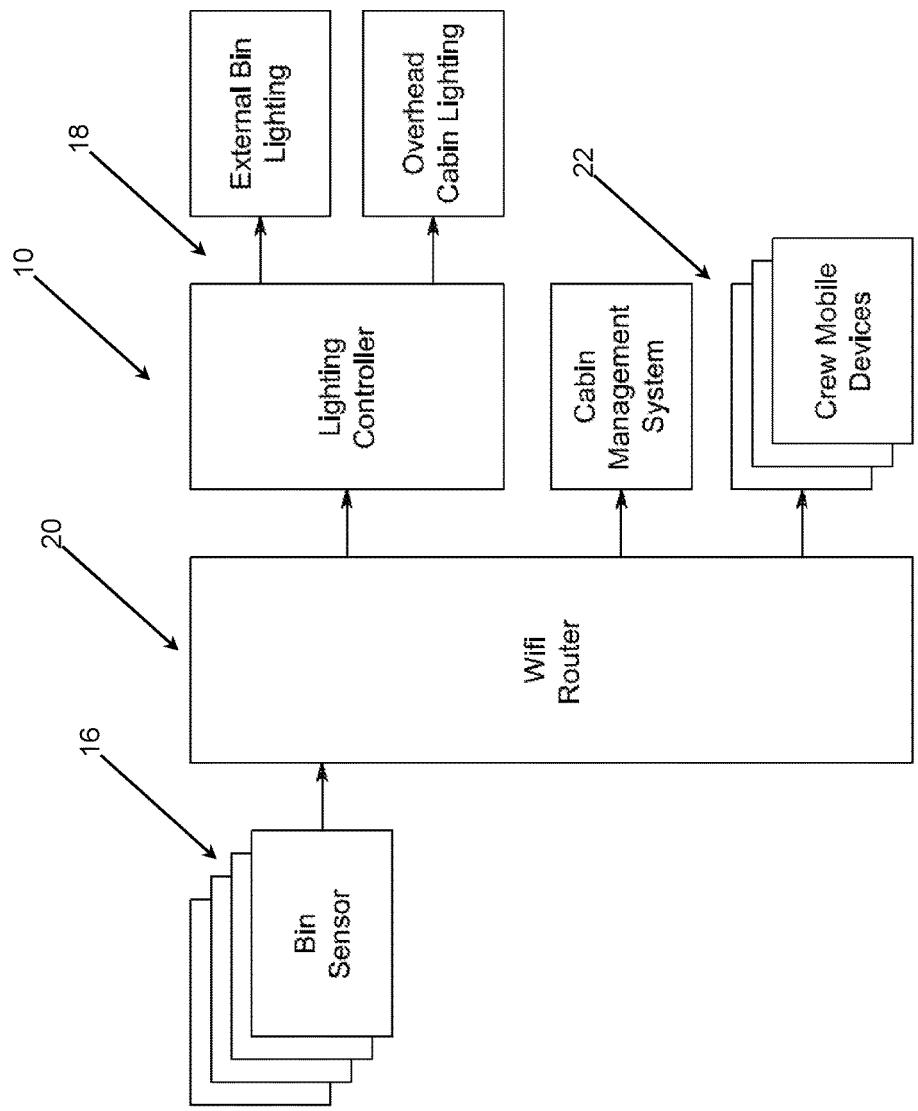
FIG. 4 is another schematic view of one exemplary embodiment of the overhead storage bin utilization detection and display system of the present disclosure.

Referring specifically to FIG. 4, the visual indicator device 18 may include sub-components including a lighting controller, external bin lighting, and/or overhead cabin lighting and the wired or wireless link may be to a CMS or crew mobile device, for example.

A server, when used, is a digital computer that, in terms of hardware architecture, generally includes a processor, input/output (I/O) interfaces, a network interface, a data store, and memory. It should be appreciated by those of ordinary skill in the art that a practical embodiment of the server may include additional components and suitably configured processing logic to support known or conventional operating features that are not described in detail herein. The components are communicatively coupled via a local interface. The local interface may be, for example but not limited to, one or more buses or other wired or wireless connections, as is known in the art. The local interface may have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The controller/processor is a hardware device for executing software instructions. The controller/processor may be any custom made or commercially available processor, a central processing unit (CPU), an auxiliary processor among several processors associated with the server, a semiconductor-based microprocessor (in the form of a microchip or chip set), or generally any device for executing software instructions. When the server is in operation, the controller/processor is configured to execute software stored within the memory, to communicate data to and from the memory, and to generally control operations of the server pursuant to the software instructions. The I/O interfaces may be used to receive user input from and/or for providing system output to one or more devices or components. User input may be provided via, for example, a keyboard, touch pad, and/or a mouse. System output may be provided via a display device and a printer (not shown). I/O interfaces may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface may be used to enable the server to communicate on a network, such as the Internet, a wide area network (WAN), a local area network (LAN), and the like, etc. The network interface may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface may include address, control, and/or data connections to enable appropriate communications on the network. A data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media. In one example, the data store may be located internal to the server such as, for example, an internal hard drive connected to the local interface in the server. Additionally, in another embodiment, the data store may be located external to the server such as, for example, an external hard drive connected to the I/O interfaces (e.g., SCSI or USB connection). In a further embodiment, the data store may be connected to the server through a network, such as, for example, a network attached file server.

The memory may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but can be accessed by the controller/processor 34. The software in memory may include one or more software programs, each of which includes an ordered listing of executable instructions for implementing logical functions. The software in the memory includes a suitable operating system (O/S) and one or more programs. The operating system essentially controls the execution of other computer programs, such as the one or more programs, and provides scheduling, input-output control, file and data management, memory management, and communication control and related services. The one or more programs may be configured to implement the various processes, algorithms, methods, techniques, etc. described herein.

The mobile device can be a digital device that, in terms of hardware architecture, generally includes a processor, input/output (I/O) interfaces, a radio, a data store, and memory. It should be appreciated by those of ordinary skill in the art that a practical embodiment may include additional components and suitably configured processing logic to support known or conventional operating features that are not described in detail herein. The components are communicatively coupled via a local interface. The local interface can be, for example but not limited to, one or more buses or other wired or wireless connections, as is known in the art. The local interface can have additional elements, which are omitted for simplicity, such as controllers, buffers (caches), drivers, repeaters, and receivers, among many others, to enable communications. Further, the local interface may include address, control, and/or data connections to enable appropriate communications among the aforementioned components.

The processor is a hardware device for executing software instructions. The processor can be any custom made or commercially available processor, a central processing unit (CPU), an auxiliary processor among several processors associated with the memory, a semiconductor-based microprocessor (in the form of a microchip or chip set), or generally any device for executing software instructions. When the mobile device is in operation, the processor is configured to execute software stored within the memory, to communicate data to and from the memory, and to generally control operations of the mobile device pursuant to the software instructions. In an exemplary embodiment, the processor may include a mobile optimized processor such as optimized for power consumption and mobile applications. The I/O interfaces can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces can also include, for example, a serial port, a parallel port, a small computer system interface (SCSI), an infrared (IR) interface, a radio frequency (RF) interface, a universal serial bus (USB) interface, and the like. The I/O interfaces can include a graphical user interface (GUI) that enables a user to interact with the memory. Additionally, the I/O interfaces may further include an imaging device, i.e. camera, video camera, etc.

The radio enables wireless communication to an external access device or network. Any number of suitable wireless data communication protocols, techniques, or methodologies can be supported by the radio, including, without limitation: RF; IrDA (infrared); Bluetooth; ZigBee (and other variants of the IEEE 802.15 protocol); IEEE 802.11 (any variation); IEEE 802.16 (WMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); Land Mobile Radio (LMR); Digital Mobile Radio (DMR); Terrestrial Trunked Radio (TETRA); Project 25 (P25); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store may be used to store data. The data store may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store may incorporate electronic, magnetic, optical, and/or other types of storage media.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality with the mobile device. In a typical example, the end user typically uses one or more of the programs along with a network. The programs can include an application or "app" which provides various functionality.

In general, all housings, data stores, and memories described herein may be hardened such that components and data may be preserved in the event of a catastrophic occurrence or the like.

Again, in general, the overhead storage bin space utilization detection and display system described herein detects bags or other objects within an overhead storage bin, assesses both horizontal and vertical space utilization within the overhead storage bin, and communicates this information to passengers and/or crew members such that empty overhead storage bin space can be readily identified and utilized. The information is communicated to passengers and/or crew members via indicator lights, a display, and/or a mobile device coupled to the system via a controller/processor and a wired or wireless link. Although an overhead storage bin is specifically referred to herein, it will be readily apparent to those of ordinary skill in the art that the system may be used equally in conjunction with any other type of storage bin utilized in an airplane, boat, train, bus, or the like. The fewer overhead storage bin doors each passenger has to open and the more quickly each passenger finds empty overhead storage bin space for their bags the better in terms of efficiency and safety. Such advantages are enabled by the overhead storage bin space utilization detection and display system described herein.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A storage bin space utilization detection and display system for use with a storage bin for storing one or more objects, comprising:
   a plurality of sensors disposed within an interior portion of the storage bin, wherein each of the plurality of sensors is associated with one of a plurality of regions defined within the interior portion of the storage bin, wherein each of the plurality of sensors is operable for detecting a presence/absence of the one or more objects within the associated region defined within the interior portion of the storage bin, and wherein each of the plurality of sensors is operable for determining one or more of a relative size of the one or more objects within the associated region defined within the interior portion of the storage bin and an amount of space remaining within the associated region defined within the interior portion of the storage bin; and
   a visual indicator device operable for indicating the detected presence/absence of the one or more objects within the associated region defined within the interior portion of the storage bin to an individual outside of the storage bin.

2. The system of claim 1, wherein the plurality of sensors are mounted to a fixed surface disposed within the interior portion of the storage bin.

3. The system of claim 1, wherein the plurality of sensors comprise a plurality of electromagnetic beam sensors.

4. The system of claim 1, wherein the visual indicator device is further operable for indicating the determined one or more of the relative size of the one or more objects within the associated region defined within the interior portion of the storage bin and the amount of space remaining within the associated region defined within the interior portion of the storage bin to the individual outside of the storage bin.

5. The system of claim 1, wherein the plurality of sensors and the visual indicator device are coupled to one or more of a processor and a controller.

6. The system of claim 1, wherein the visual indicator device comprises one or more lights disposed outside of the storage bin.

7. The system of claim 1, wherein the visual indicator device comprises a graphical display.

8. The system of claim 1, further comprising a wireless router coupled to the plurality of sensors and wherein the visual indicator device comprises a mobile device executing an application.

9. The system of claim 1, wherein the visual indicator device is associated with a cabin management system.

10. A storage bin for storing one or more objects, comprising:
    a storage bin housing;
    a door coupled to the storage bin housing; and
    a storage bin space utilization detection and display system, comprising:
      a plurality of sensors disposed within an interior portion of the storage bin housing, wherein each of the plurality of sensors is associated with one of a plurality of regions defined within the interior portion of the storage bin housing, wherein each of the plurality of sensors is operable for detecting a presence/absence of the one or more objects within the associated region defined within the interior portion of the storage bin housing, and wherein each of the plurality of sensors is further operable for determining one or more of a relative size of the one or more objects within the associated region defined within the interior portion of the storage bin housing and an amount of space remaining within the associated region defined within the interior portion of the storage bin housing; and
      a visual indicator device operable for indicating the detected presence/absence of the one or more objects within the associated region defined within the interior portion of the storage bin housing to an individual outside of the storage bin housing.

11. The storage bin of claim 10, wherein the plurality of sensors are mounted to a fixed surface disposed within the interior portion of the storage bin housing.

12. The storage bin of claim 10, wherein the plurality of sensors comprise a plurality of electromagnetic beam sensors.

13. The storage bin of claim 10, wherein the visual indicator device is further operable for indicating the determined one or more of the relative size of the one or more objects within the associated region defined within the interior portion of the storage bin housing and the amount of space remaining within the associated region defined within the interior portion of the storage bin housing to the individual outside of the storage bin housing.

14. The storage bin of claim 10, wherein the plurality of sensors and the visual indicator device are coupled to one or more of a processor and a controller.

15. The storage bin of claim 10, wherein the visual indicator device comprises one or more lights disposed outside of the storage bin housing.

16. The storage bin of claim 10, wherein the visual indicator device comprises a graphical display.

17. The storage bin of claim 10, wherein the storage bin space utilization detection and display system further comprises a wireless router coupled to the plurality of sensors and wherein the visual indicator device comprises a mobile device executing an application.

18. The storage bin of claim 10, wherein the visual indicator device is associated with a cabin management system.

* * * * *